US011617132B2

(12) United States Patent
Del Sordo et al.

(10) Patent No.: US 11,617,132 B2
(45) Date of Patent: Mar. 28, 2023

(54) WI-FI POWER REDUCTION SYSTEM, METHOD AND MEDIA

(71) Applicant: ARRIS Enterprises LLC, Suwanee, GA (US)

(72) Inventors: Chris Del Sordo, Souderton, PA (US); James M. Moss, Suwanee, GA (US); Albert Elcock, West Chester, PA (US); Charles Hardt, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 69 days.

(21) Appl. No.: 17/205,537

(22) Filed: Mar. 18, 2021

(65) Prior Publication Data

US 2021/0345240 A1      Nov. 4, 2021

Related U.S. Application Data

(60) Provisional application No. 63/018,144, filed on Apr. 30, 2020.

(51) Int. Cl.
*H04W 48/16* (2009.01)
*H04W 52/02* (2009.01)
*H04W 64/00* (2009.01)

(52) U.S. Cl.
CPC ....... *H04W 52/0206* (2013.01); *H04W 48/16* (2013.01); *H04W 64/006* (2013.01)

(58) Field of Classification Search
CPC ............. H04W 52/0206; H04W 48/16; H04W 64/006; H04W 52/0258; H04W 52/028;
(Continued)

(56) References Cited

U.S. PATENT DOCUMENTS 10,542,466 B1    1/2020   Indurkar et al.
2013/0086665 A1  4/2013   Filippi et al.
(Continued)

FOREIGN PATENT DOCUMENTS

| CN | 110730448 A | * | 1/2020 | ............. H04B 11/00 |
| JP | 2006332844 A | * | 12/2006 | ........ H04W 52/0206 |
| WO | WO-2011144127 A2 | * | 11/2011 | ............. H04W 12/12 |

OTHER PUBLICATIONS

Anonymous: "Multi-SSID Deployment Considerations", Sep. 5, 2019 (Sep. 5, 2019), XP055817156, Retrieved from the Internet: URL:http://web.archive.org/web/20190905103432/https://documentation.meraki.com/MR/WiFi_Basics_and_Best_Practices/Multi-SSID_Deployment_Considerations, the whole document.
(Continued)

*Primary Examiner* — Said M Elnoubi
(74) *Attorney, Agent, or Firm* — Wenderoth, Lind & Ponack, L.L.P.

(57) ABSTRACT

A server includes a processor configured to execute instructions stored on a memory to cause the server to: receive a client position signal; predict a future position of a client device based on a client device position signal providing location and velocity information about the client device; instruct a first access point device to provide a first Wi-Fi hotspot network with a first SSID, currently in use by the client device with another access point device, based on the predicted future position of the client device; and instruct a second access point device, which was previously providing a second Wi-Fi hotspot network with the first SSID, to stop providing the second Wi-Fi hotspot network with the first SSID after instructing the first access point device to provide the first Wi-Fi hotspot network with the first SSID.

20 Claims, 10 Drawing Sheets

(58) Field of Classification Search
CPC . H04W 52/0229; H04W 36/08; H04W 36/18; H04W 36/32; H04W 84/12; H04W 88/08; Y02D 30/70
See application file for complete search history.

(56) References Cited

U.S. PATENT DOCUMENTS

| | | |
|---|---|---|
| 2015/0065146 A1 | 3/2015 | Wenger |
| 2016/0112942 A1 | 4/2016 | Chang et al. |
| 2017/0245211 A1* | 8/2017 | Patil .................... H04W 8/005 |
| 2018/0088205 A1* | 3/2018 | Shamain ............... G01S 5/0268 |
| 2018/0152843 A1 | 5/2018 | Coughlin et al. |

OTHER PUBLICATIONS

International Search Report and the Written Opinion of the International Searching Authority dated Aug. 30, 2021 in International (PCT) Application No. PCT/US2021/022941.
O'leary Mark: "The Care and feeding of SSIDs Contents", jisc.ac.uk, Jul. 1, 2005 (Jul. 1, 2005), XP055816985, https://community.jisc.as.uk/library/advisory-services/care-and-feeding-ssids Retrieved from the Internet: URLhttps://community.jisc.ac.uk/printpdf/737 p. 3-4.
"Information Technology—Telecommunications and information exchange between systems Local and Metropolitan area networks—Specific requirements Part 11: Wireless LAN Medium Access Control (MAC) and Physical Layer (PHY) Specifications; ISO/IEC/IEEE 8802-11:2012 (E) (Revision of ISO/IEC/IEEE 8802-11-2005", IEEE Standard, IEEE, Piscataway, NJ, USA, Nov. 22, 2012 (Nov. 22, 2012), pp. 1-2798, XP068045704, ISBN: 978-0-7381-8007-6 sections 4.3.3, 4.5.3.5, 4.3.8.2 and 8.2.3.2.

* cited by examiner

WI-FI POWER REDUCTION SYSTEM, METHOD AND MEDIA

BACKGROUND

Embodiments of the invention relate to Wi-Fi hotspot networks.

A multiple-system operator (MSO) is an operator of multiple cable or direct-broadcast satellite television systems. MSO's and other vendors are beginning to deploy outdoor Wi-Fi access point devices in dense urban areas, sports arenas, train stations, airports, etc. A Wi-Fi access point device (APD) is a networking hardware device that allows other Wi-Fi devices to connect to a wired network. The APD usually connects to a router (via a wired network) as a standalone device, but it can also be an integral component of the router itself. An APD is differentiated from a hotspot which is a physical location where Wi-Fi access is available. These APDs permit the MSO to offer hotspot services to their customers. Thus connecting to the MSO's data networks, instead of using their respective mobile data plan, can save the user significant cellular overage charges.

SUMMARY

Aspects of the present invention are drawn to a server for use with a plurality of client devices, a plurality of access point devices and a client device position signal associated with a client device of the plurality of client devices. Each access point device is configured to provide a respective plurality of Wi-Fi hotspot networks. Each of the plurality of Wi-Fi hotspot networks has a respective SSID. The client device position signal provides location and velocity information about the client device. The server includes a memory and a processor configured to execute instructions stored on the memory to cause the server to: receive the client device position signal; predict a future position of the client device based on the client device position signal providing location and velocity information about the client device; instruct a first access point device to provide a first Wi-Fi hotspot network with a first SSID, currently in use by the client device with another access point device, based on the predicted future position of the client device; and instruct a second access point device, which was previously providing a second Wi-Fi hotspot network with the first SSID, to stop providing the second Wi-Fi hotspot network with the first SSID after instructing the first access point device to provide the first Wi-Fi hotspot network with the first SSID.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

As mentioned above, MSOs and other vendors are beginning to deploy outdoor Wi-Fi access point devices in dense urban areas, sports arenas, train stations, airports, etc. However, in order to provide full coverage across an urban area, an MSO might deploy one or two outdoor APDs per city block. The MSOs that provide these outdoor APDs have, in turn, created secondary revenue streams by reselling data bandwidth to what could be seen as competitors. One outdoor APD could provide 4, 8 or 16 SSIDs on a single radio (2.4 or 5 GHz). However, there are inefficiencies when transmitting multiple SSIDs. For each SSID, beacons must be transmitted, and it is theoretically possible that entire radio bandwidth could be consumed just transmitting beacons on all the SSIDs. Additionally, a significant amount of electrical power is wasted transmitting beacons to non-existent clients.

Figure 1:
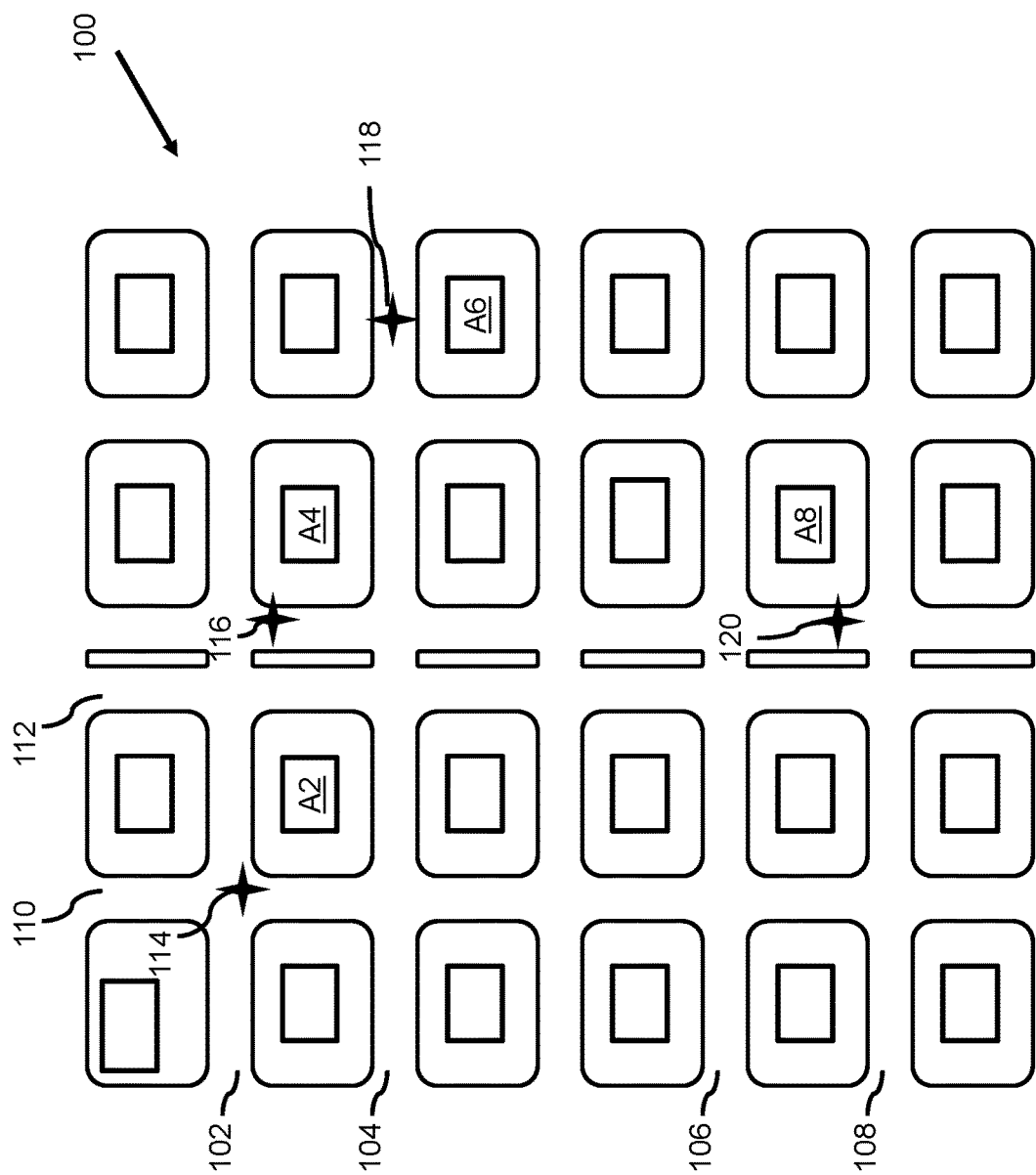
FIG. 1 illustrates a portion of a city having a conventional Wi-Fi hotspot network that includes a plurality of access point devices (APDs)

FIG. 1 illustrates a portion of a city 100 having a conventional Wi-Fi hotspot network that includes a plurality of access point devices (APDs).

As shown in the figure, city 100 includes: a plurality of eastbound-westbound streets, a sample of which are indicated as streets 102, 104, 106 and 108; a plurality of northbound-southbound streets, a sample of which are indicated as streets 110 and 112; a plurality of client devices 114, 116, 118 and 120 and a plurality of APDs, a sample of which are indicated as APDs A2, A4, A6 and A8. It should be noted that, or the purposes of discussion only, this example includes users having the respective four client devices 114, 116, 118 and 120, but this could easily be 1000 users with respective 1000 client devices.

Figure 2:
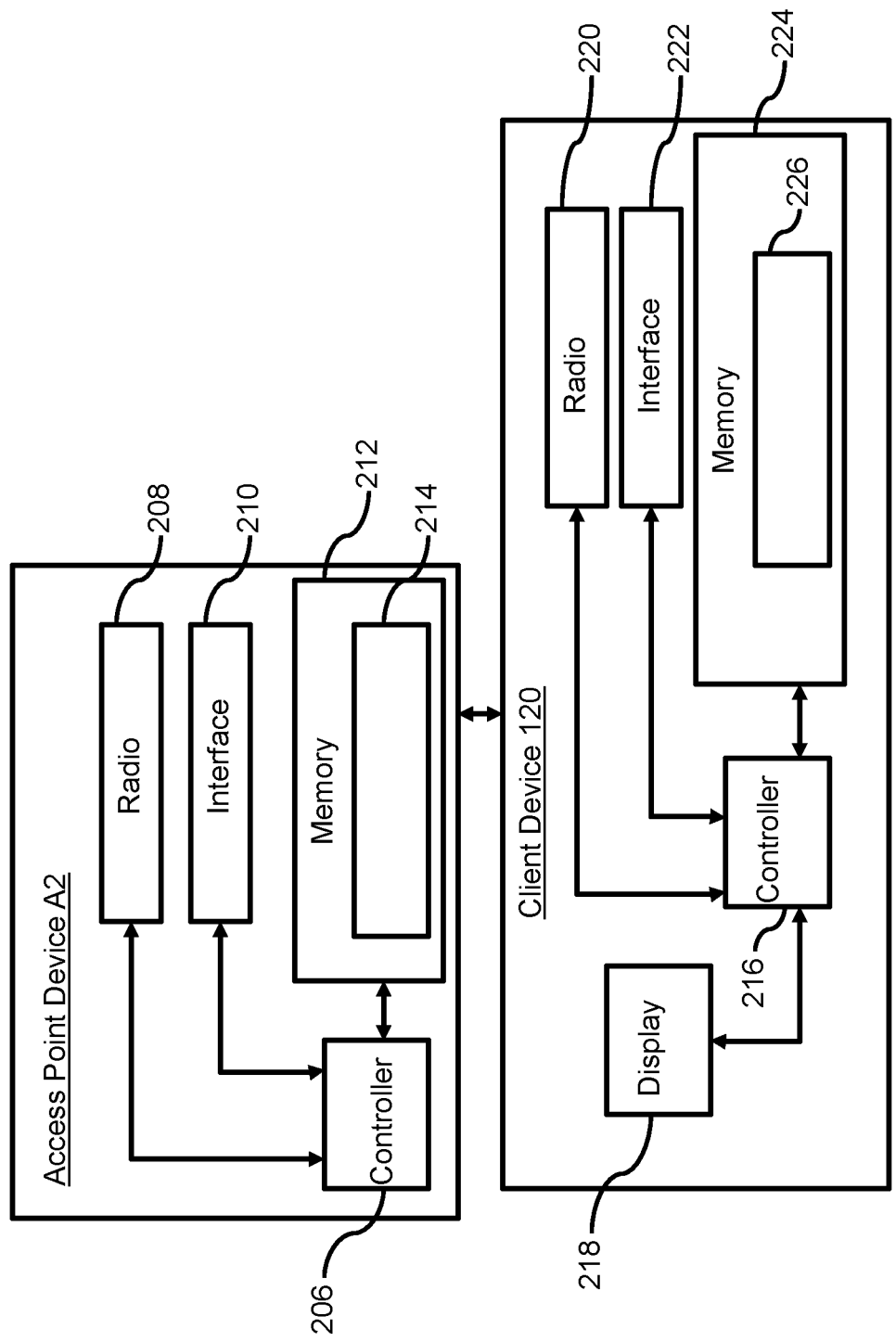
FIG. 2 illustrates an exploded view of an APD and a client device of FIG. 1.

FIG. 2 illustrates an exploded view of APD A2 and client device 120.

As shown in the figure, APD A2 includes a controller 206, a radio 208, an interface circuit 210, and a memory 212, which includes controller executable instructions 214 stored therein. Client device 120 includes a controller 216, a display 218, a radio 220, an interface circuit 222 and a memory 224, which includes controller executable instructions 226 stored therein. Further, any of the APDs in FIG. 1 may be an APD similar to APD A2.

Controller 206 can include a dedicated control circuit, CPU, microprocessor, etc. Controller 206 controls the circuits of APD A2. Memory 212 can store various programming, and user content, and data as stored data 214. Interface circuit 210 can include one or more connectors, such as RF connectors, or Ethernet connectors, and/or wireless communication circuitry, such as 5G circuitry and one or more antennas. Interface circuit 210 receives service from a service provider by known methods, non-limiting examples of which include terrestrial antenna, satellite dish, wired cable, DSL, optical fibers, or 5G as discussed above. Through interface circuit 210, APD A2 receives an input signal, including data and/or audio/video content, from the service provider and can send data to the service provider.

Radio 208 (and preferably two or more radios) may also be referred to as a wireless communication circuit, such as a Wi-Fi WLAN interface radio transceiver, and is operable to communicate with client devices, such as client device 120. Radio 208 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. APD A2 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency For Consumer Electronics (RF4CE) protocol, Zigbee protocol, and/or IEEE 802.15.4 protocol, which also communicates in the ISM band.

In client device 120, controller 216, which can include a dedicated control circuit, CPU, microprocessor, etc., controls the circuits of client device 120. Memory 224 can store various programming, and user content, and data as stored data 226. Radio 220 may include a Wi-Fi WLAN interface radio transceiver that is operable to communicate with APD A2 and also may include a cellular transceiver operable to communicate with cellular service provider through a cellular network. Radio 220 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Client device 120 can also be equipped with a radio to implement a Bluetooth interface radio transceiver and antenna, which communicates wirelessly in the ISM band, from 2.400 to 2.485 GHz. As an alternative, at least one of the radios can be a RF4CE protocol, Zigbee protocol, and/or IEEE 802.15.4 protocol, which also communicates in the ISM band. Further, any of the client devices in FIG. 1 may be a client device similar to client device 120.

Figure 3:
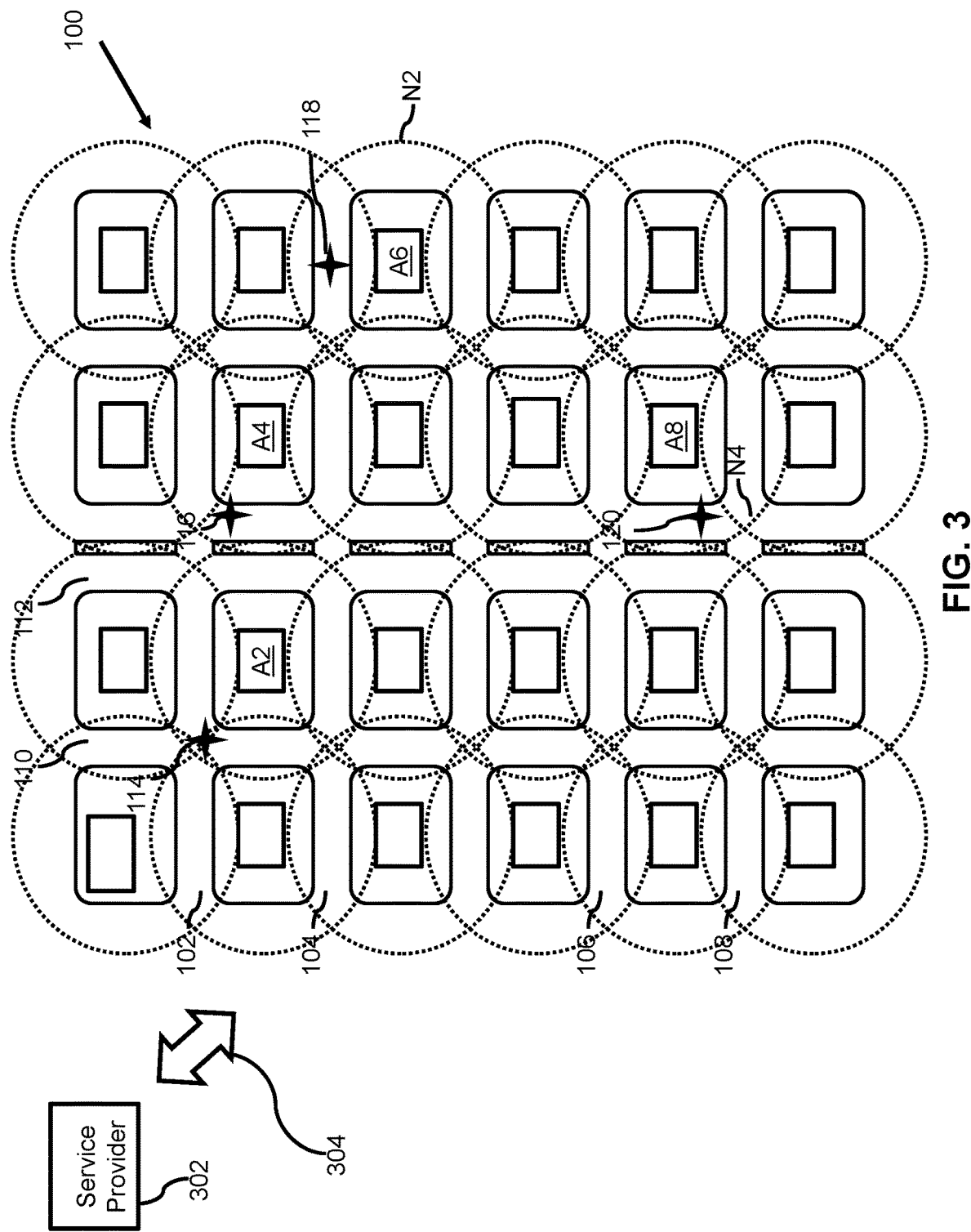
FIG. 3 illustrates a service provider providing outdoor Wi-Fi coverage over the portion of the city of FIG. 1.

FIG. 3 illustrates the portion of city 100 as shown in FIG. 1 with the addition of a service provider 302, providing a service indicated by double arrow 304 and a plurality of Wi-Fi hotspot networks provided by the plurality of APDs, respectively. A sample of the plurality of Wi-Fi hotspot networks are indicated as Wi-Fi hotspot network N2, which is provided by APD A6 and Wi-Fi hotspot network N4, which is provided by APD A2.

FIG. 3 illustrates service provider 302, e.g., an MSO, providing outdoor Wi-Fi coverage over portion of city 100. In this example there is one outdoor APD per city block with a total of 24 APDs. In this example, users have client devices that are attached to a respective APD in following zones: client device 114 with the Wi-Fi coverage of APD A2; client device 116 with the Wi-Fi coverage of APD A4; client device 118 with the Wi-Fi coverage of APD A6 and client device 120 with the Wi-Fi coverage of APD A8. All other APDs in this example have no clients. In this use case, only 4 of 24 APDs are being used or 16%. Therefore, 83% of the APDs are using power to send beacons to non-existent clients.

Further, in this example, there are only four people walking thru the city, so it is highly inefficient to transmit on all APDs (24) and with both radios (2.4 and 5 GHz). At peak periods, there may be 1000 users, and all 24 APDs may be in use.

Some MSOs offer their subscribers a Wi-Fi anywhere feature. This allows an individual subscriber to connect to any APD within the MSO's footprint. Further, some MSOs may resell surplus bandwidth/SSIDs on their outdoor APDs. For example, an MSO may rent network capacity to up to 7 other competitors. Each of these vendors is given a unique SSID on both 2.4 and 5 GHz bands. All SSIDs are beaconing at the standard rates. Thus, assuming there are 8 SSIDs, 32% of the bandwidth is being consumed by the beacons alone (2.4 GHz). This bandwidth is being consumed by beacons alone, and not consumed by data being sent to or from clients.

What is needed is a system and method to reduce the bandwidth consumed by multiple beacon transmission and to reduce power consumption of unused radio transmitters.

A system and method in accordance with the present disclosure reduces the bandwidth consumed by multiple beacon transmission and reduces power consumption of unused radio transmitters.

In accordance with the present disclosure, an APD only broadcasts a Wi-Fi network as needed, based on a received probe request or an activation signal from a service provider indicating that a user will likely need the Wi-Fi network in the near future.

Most clients can actively or passively scan for an APD. In an active scan session, the client sends out probe request broadcasts looking for any APD, and an APD responds via probe response messages. In the case of a passive scan, the only looks for Wi-Fi beacons, and upon encountering one it has connected to in the past, initiates a reconnection sequence.

Given that it is unlikely that an APD would have clients connected on all SSIDs that may be simultaneously provided by the APD, e.g., 8 SSIDs, overall traffic/throughput could be reduced by removing unnecessary beacons. An unnecessary beacon may be a beacon transmitted to non-existing clients. While beacons contain other necessary information, transmission of the beacons may be suspended until needed. That is, the APD will stop sending beacons until a probe request is received from a client device. Once a client device makes a probe request, and the APD responds, beacons will start on the SSID in question, and connections will be permitted.

Energy consumption may be further reduced by shutting off transmitters of all radios that are not connected to an active client device. Consider the situation wherein four users are all stationary, not moving through an urban area. Since each user is stopped, there is no need for other APDs in the urban area to be transmitting. Thus only 4 APDs would be enabled and for receiving and transmitting. Only activating those 4 APDs with clients would reduce power consumption potentially by 83%.

Some example embodiments reduce power consumption by operating each radio in a standby mode, if no client is connected to it.

Some example embodiments reduce power consumption in APDs that have two radios, e.g., a 5 GHz radio and a 2.4 GHz radio, wherein the one of the radios, e.g., the 5 GHz radio, is shut off if no client is connected to it. Almost all mobile devices that support 5 GHz channels also support 2.4 GHz channels. Therefore, it is possible to enable only the 2.4 GHz APD radio, and when a client device connects to the 2.4 GHz radio, the APD will determine whether the client device also supports 5 GHz. If the client device does, then the 5

GHZ radio may be switched on, and the client device is steered (moved) from the 2.4 GHz radio over to the 5 GHz radio. The action of shutting off the 5 GHz radio until it is needed will reduce power consumption by as much as 50% per APD.

Should the user of a client device start to walk through the city, only those APDs in the immediate vicinity would be turned on. As will be described in greater detail below, only those APDs with which the user currently resides, or will potentially travel into, will be activated.

In some embodiments, each APD is in contact with a service provider, which may take the form of a server that operates as an electronic communication traffic server device, which may log the location of each client device, and determining the path the user is expected to travel. With this location and expected travel path information, the electronic communication traffic service device may notify other APDs to turn on and connect to the client device of the user, as needed.

In some embodiments, a cellular service provider that provides cellular service to a client device may determine the location and velocity of the client device. The cellular service provider may provide the location and velocity information to the electronic communication traffic server device, which may log the location of each client device and determine the path the user is expected to travel. With this location and expected travel path information, the electronic communication traffic service device may notify other APDs to turn on and connect to the client device of the user, as needed.

As the user of the client device begins to move through the city, other APDs may be activated by the electronic communication traffic service device. The electronic communication traffic service device would proactively activate APDs in the user's direction of travel. Likewise, the electronic communication traffic service device would shut off APDs that are no longer needed, or place them in a standby mode. In some embodiments, each activated APD may send positioning information for each client device back to the electronic communication traffic service device.

An example system and method for managing a network of APDs in order to reduce power consumption in accordance with aspects of the present disclosure will now be described in greater detail with reference to FIGS. 4-8.

Figure 4:
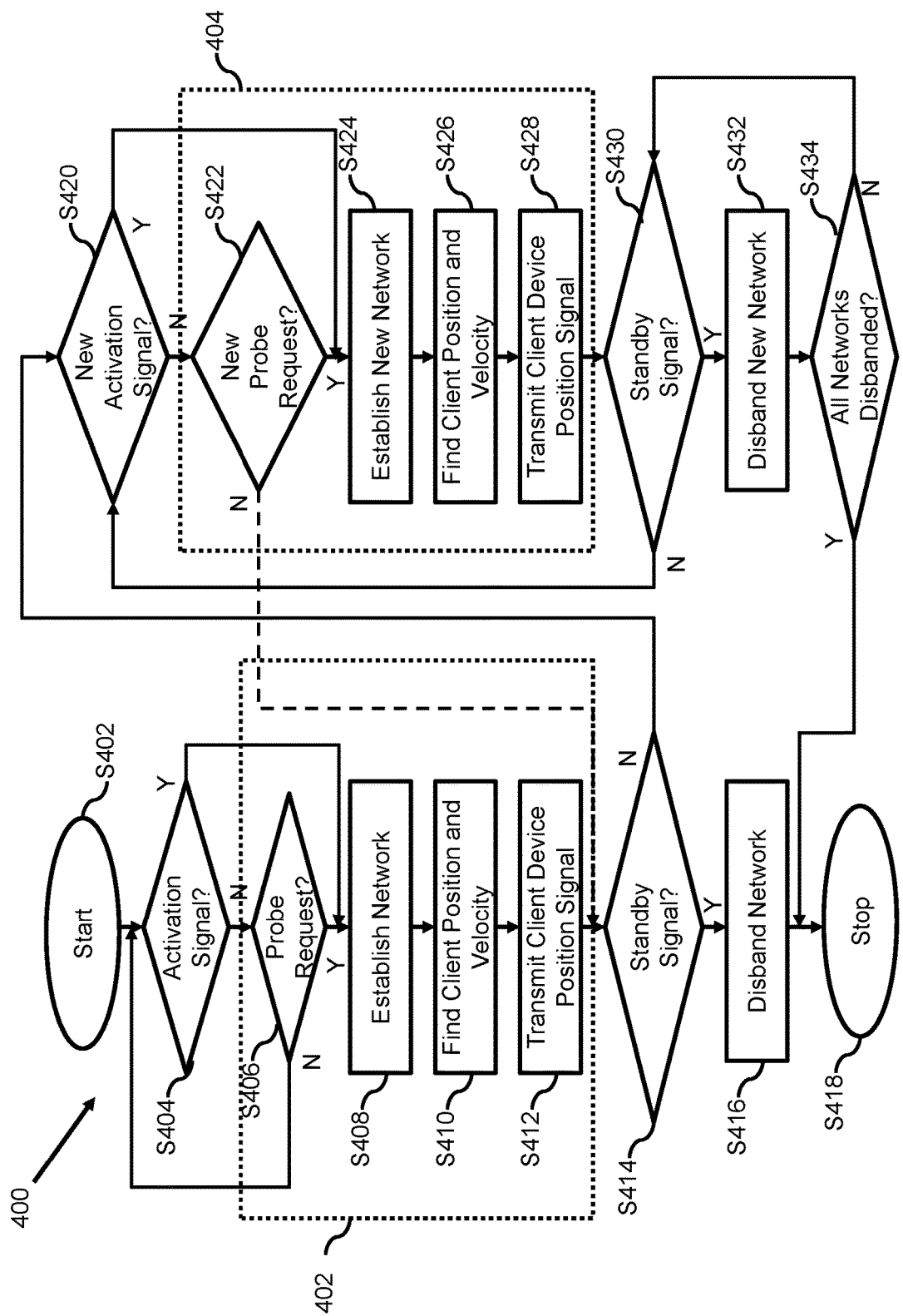
FIG. 4 illustrates an example method for operating an APD within a network of APDs in order to reduce power consumption in accordance with aspects of the present disclosure.

FIG. 4 illustrates an example method 400 for operating an APD within a network of APDs in order to reduce power consumption in accordance with aspects of the present disclosure.

As shown in the figure, method 400 starts (S402), and it is determined whether an activation signal is received (S404). Initially, consider an initial situation wherein 4 client devices are within a portion of a city. This will be described in greater detail with reference to FIGS. 5A and 6A. Then a discussion of receipt of the activation signal will be provided.

Figure 5A:
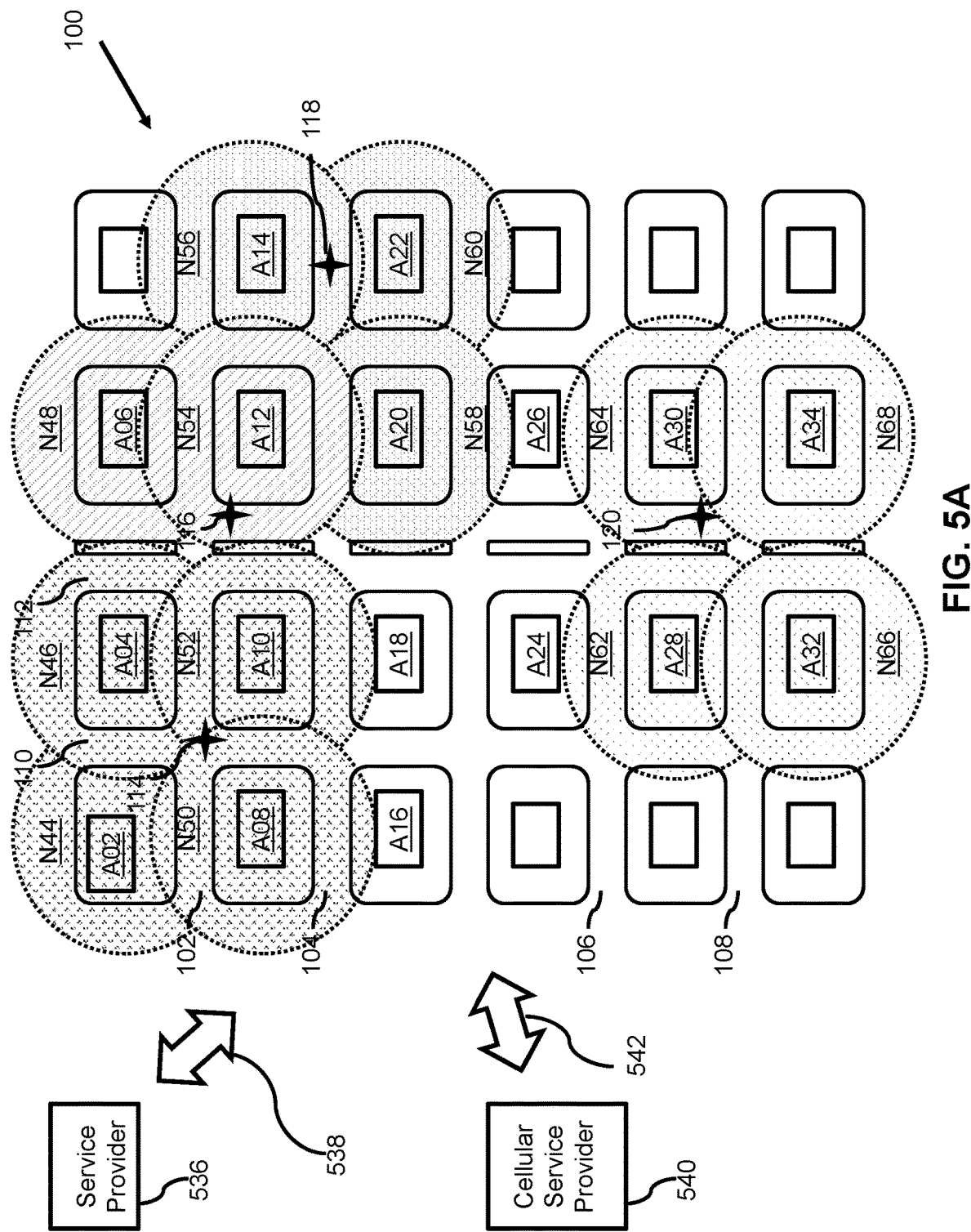
FIG. 5A illustrates the portion of the city of FIG. 1, at a time $t_1$, having a Wi-Fi hotspot network that includes a plurality of APDs, in accordance with aspects of the present disclosure.

FIG. 5A illustrates the portion of city 100, at a time $t_1$, having a Wi-Fi hotspot network that includes a plurality of access point devices (APDs), in accordance with aspects of the present disclosure.

As shown in the figure, city 100 includes: plurality of eastbound-westbound streets, the sample of which are indicated as streets 102, 104, 106 and 108; plurality of northbound-southbound streets, the sample of which are indicated as streets 110 and 112; plurality of client devices 114, 116, 118 and 120; a plurality of APDs, a sample of which is indicated as APDs A02, A04, A06, A08, A10, A12, A14, A16, A18, A20, A22, A24, A26, A28, A30, A32, A34; a service provider 536 providing a service indicated as double arrow 538; a cellular service provider 540 providing a cellular service indicated as double arrow 542; and a plurality of Wi-Fi hotspot networks provided by the plurality of APDs, respectively, a sample of the plurality of Wi-Fi hotspot networks is indicated as a Wi-Fi hotspot network N44, which is provided by APD A02, a Wi-Fi hotspot network N46, which is provided by APD A04, a Wi-Fi hotspot network N48, which is provided by APD A06, a Wi-Fi hotspot network N50, which is provided by APD A08, a Wi-Fi hotspot network N52, which is provided by APD A10, a Wi-Fi hotspot network N54, which is provided by APD A12, a Wi-Fi hotspot network N56, which is provided by APD A14, a Wi-Fi hotspot network N58, which is provided by APD A20, a Wi-Fi hotspot network N60, which is provided by APD A22, a Wi-Fi hotspot network N62, which is provided by APD A28, a Wi-Fi hotspot network N64, which is provided by APD A30, a Wi-Fi hotspot network N66, which is provided by APD A32, and a Wi-Fi hotspot network N68, which is provided by APD A34.

In accordance with aspects of the present disclosure, each APD is only providing a Wi-Fi network for any specific client device within its broadcasting range, or as directed by service provider 536 through service 538. This is in direct comparison with the conventional system discussed above with reference to FIG. 3, wherein each APD is constantly providing a maximum number, e.g., 8, of Wi-Fi networks in the event that a client device might enter into its broadcast range.

At time $t_1$, discussed above with reference to FIG. 5A: APDs A02, and A08 are broadcasting only a single SSID to potentially provide Wi-Fi hotspot service to client device 114 at a future time; APD A10 is broadcasting one SSID to provide Wi-Fi hotspot service to client device 114 at time $t_1$ and is additionally broadcasting a second SSID to potentially provide Wi-Fi hotspot service to client device 116 at a future time; APD A04 is broadcasting one SSID to potentially provide Wi-Fi hotspot service to client device 114 at a future time and is additionally broadcasting a second SSID to potentially provide Wi-Fi hotspot service to client device 116 at a future time; APD A06 is broadcasting one SSID to potentially provide Wi-Fi hotspot service to client device 116 at a future time; APD A12 is broadcasting one SSID to provide Wi-Fi hotspot service to client device 116 at time $t_1$ and is additionally broadcasting a second SSID to potentially provide Wi-Fi hotspot service to client device 118 at a future time; APD A14 is broadcasting one SSID to provide Wi-Fi hotspot service to client device 118 at time $t_1$; APDs A20 and A22 are broadcasting only a single SSID to potentially provide Wi-Fi hotspot service to client device 118 at a future time; APDs A28, A32 and A34 are broadcasting only a single SSID to potentially provide Wi-Fi hotspot service to client device 120 at a future time; and APD A30 is broadcasting one SSID to provide Wi-Fi hotspot service to client device 120 at time $t_1$.

In this example embodiment, for the purposes of discussion, let each APD be configured to broadcast eight (8) different SSIDs, wherein each of the broadcasts would provide one eighth (⅛) of the total power that may be expended in broadcasting. Therefore a maximum power expenditure, $p_{max}$, would be equal to the total number of APDs, n, times the total number of available broadcast SSIDs, b, or:

$$P_{max} = nb \quad (1)$$

which in this example would be $P_{max}=24*8=192$ power units.

It should be noted that is the power that is constantly consumed by the conventional system discussed above with reference to FIG. 3.

However, in accordance with aspects of the present disclosure, at time $t_1$, as discussed above, the present power expenditure, $p_p$, would be equal to the sum of the SSIDs from the APDs that are presently broadcasting. In this example, APDs A02, A06, A08, A14, A22, A28, A30, A32 and A34 are broadcasting a single SSID, and APDs A04, A10, A12 and A20 are broadcasting two SSIDs. Therefore, the present power expenditure, $p_p$, at time $t_1$ would be 9*(1)+4*(2), or 17 power units.

By comparing the power that is constantly consumed by the conventional system discussed above with reference to FIG. 3, with the example embodiment of the present disclosure discussed above with reference to FIG. 5A, the percentage of power savings at time $t_1$ is (192-17)/192, or 91.1% savings in power expenditure in broadcasting.

FIG. 5A illustrates a situation wherein some APDs are already broadcasting a Wi-Fi network. To arrive at this situation, each of these broadcasting APDs were previously (at some point in time) in a standby mode and had been activated to a broadcast mode. Such activation may be performed by receiving an activation signal from service provider 536 or by receiving a probe request from a client device.

Different embodiments for a standby mode will first be described with additional reference to FIG. 6A. Then different embodiments for receiving an activation signal will be described.

One embodiment for implementing a standby mode, may be termed a no-broadcast standby mode, wherein a broadcasting component of a radio of an APD will not broadcast until the receiver component of the radio receives either an initiate signal from the service provider or a probe request from a client device. This no-broadcast standby mode will be described with reference to FIG. 6A.

Figure 6A:
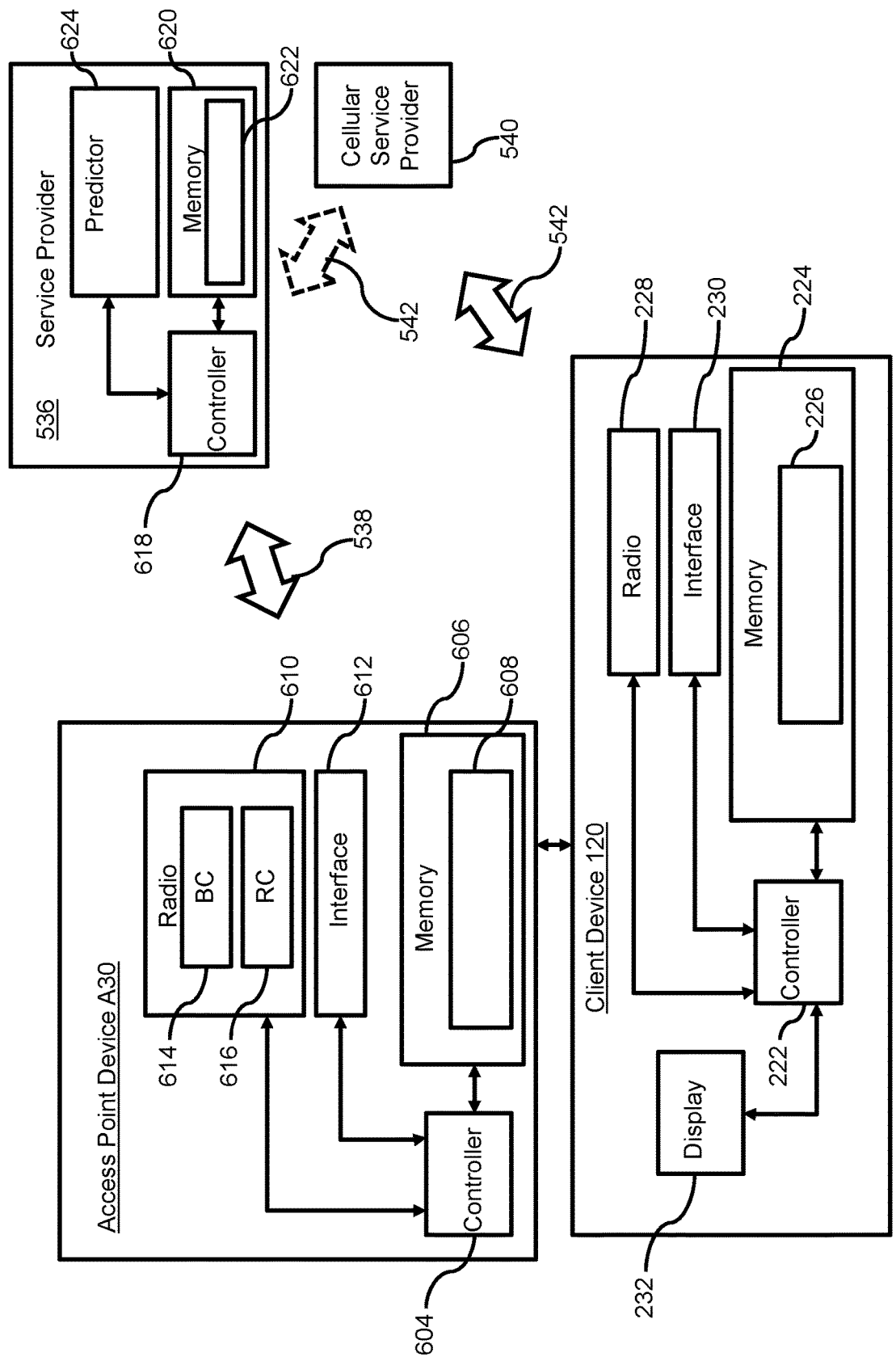
FIG. 6A illustrates an exploded view of an APD, a client device, a service provider of FIG. 5A.

FIG. 6A illustrates an exploded view of APD A30, client device 120, and service provider 536.

As shown in the figure, APD A30 includes a controller 604, a radio 610, an interface circuit 612, and a memory 606, which includes controller executable instructions 608 stored therein. Radio 610 includes a broadcasting component 614 and a receiving component 616.

In this example, controller 604, radio 610, interface circuit 612, and memory 606 are illustrated as individual devices. However, in some embodiments, at least two of controller 604, radio 610, interface circuit 612, and memory 606 may be combined as a unitary device. Further, in some embodiments, at least one of controller 604, radio 610, interface circuit 612, and memory 606 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

In this example, broadcasting component 614 and receiving component 616 are illustrated as individual devices. However, in some embodiments, broadcasting component 614 and receiving component 616 may be combined as a unitary device. Further, in some embodiments, at least one of broadcasting component 614 and receiving component 616 may be implemented as a computer having non-transitory computer-readable media for carrying or having computer-executable instructions or data structures stored thereon.

Controller 604 can include a dedicated control circuit, CPU, microprocessor, etc. Controller 604 controls the circuits of APD A30. Memory 606 can store various programming, and user content, and data as stored data 608.

As will be described in more detail below, stored data 608 includes instructions that may be used by controller 604 to cause APD A30 to establish a Wi-Fi hotspot network with a SSID based on at least one of an activation signal and a probe request associated with the SSID, wherein the probe request is transmitted from a client device, such as client device 120. Stored data 608 includes instructions that may be used by controller 604 to cause APD A30 to additionally operate the Wi-Fi hotspot network with the SSID in a standby mode based upon one of the group consisting of receipt of a standby signal from service provider 536 and a disassociation from an associated client device, wherein the associated client device is the client device having been associated with the established Wi-Fi hotspot network.

As will be described in more detail below, in some non-limiting example embodiments, stored data 608 includes instructions that may be used by controller 604 to cause APD A30 to additionally determine a position and a velocity of the client device when the client device is associated with the established Wi-Fi hotspot network. Further, in these non-limiting example embodiments, stored data 608 includes instructions that may be used by controller 604 to cause APD A30 to further transmit a client device position signal to service provider 536, wherein the client device position signal is based on the determined position and velocity of client device.

As will be described in more detail below, in some non-limiting example embodiments, stored data 608 includes instructions that may be used by controller 604 to cause APD A30 to additionally operate the Wi-Fi hotspot network with the SSID in the standby mode a predetermined time period after the disassociation from the associated client device.

As will be described in more detail below, in some non-limiting example embodiments, broadcasting component 614 is configured to broadcast data associated with the Wi-Fi hotspot network, and receiving component 616 is configured to receive the activation signal, the probe request and the standby signal. Further, when operating the Wi-Fi hotspot network with the SSID in the standby mode, controller 604 is configured to turn broadcasting component 614 off to save power.

Interface circuit 612 can include one or more connectors, such as RF connectors, or Ethernet connectors, and/or wireless communication circuitry, such as 5G circuitry and one or more antennas. Interface circuit 612 receives service from service provider 536 by known methods, non-limiting examples of which include terrestrial antenna, satellite dish, wired cable, DSL, optical fibers, or 5G as discussed above. Through interface circuit 612, APD A30 receives an input signal, including data and/or audio/video content, from the service provider and can send data to the service provider.

Radio 610 (and preferably two or more radios), may also be referred to as a wireless communication circuit, such as a Wi-Fi WLAN interface radio transceiver and is operable to communicate with client devices, such as client device 120. Radio 610 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols.

APD A30 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency For Consumer Electronics (RF4CE) protocol, Zigbee protocol, and/or IEEE 802.15.4 protocol, which also communicates in the ISM band.

Service provider 536 includes a controller 618, a memory 620, which includes controller executable instructions 622 stored therein, and a predictor 624.

In this example, controller 618, memory 620 and predictor 624 are illustrated as individual devices. However, in some embodiments, at least two of controller 618, memory 620 and predictor 624 may be combined as a unitary device. Further, in some embodiments, at least one of controller 618, memory 620 and predictor 624 may be implemented as a computer having non-transitory computer-readable media for carrying or having computer-executable instructions or data structures stored thereon.

Controller 618 can include a dedicated control circuit, CPU, microprocessor, etc. Controller 618 controls the circuits of service provider 536. Memory 620 can store various programming, and user content, and data as stored data 622.

As will be described in more detail below, in some non-limiting example embodiments, stored data 622 includes instructions that may be used by controller 618 to cause service provider 624 to receive a client position signal, and predict a future position of the client device based on the client device position signal providing location and velocity information about the client device. Stored data 622 includes instructions that may be used by controller 618 to cause service provider 536 to additionally instruct a first access point device to provide a first Wi-Fi hotspot network with a first SSID, currently in use by the client device with another access point device, based on the predicted future position of the client device and instruct a second access point device, which was previously providing a second Wi-Fi hotspot network with the first SSID, to stop providing the second Wi-Fi hotspot network with the first SSID after instructing the first access point device to provide the first Wi-Fi hotspot network with the first SSID.

As will be described in more detail below, in some non-limiting example embodiments, stored data 622 includes instructions that may be used by controller 618 to cause service provider 624 to further instruct a third access point device to provide a third Wi-Fi hotspot network with the first SSID. In some embodiments, stored data 622 includes instructions that may be used by controller 618 to cause service provider 624 to still further receive the client device position signal from the third access point device, whereas in other embodiments, stored data 622 includes instructions that may be used by controller 618 to cause service provider 624 to still further receive the client device position signal from a cellular service provider associated with the client device.

As will be described in more detail below, in some non-limiting example embodiments, stored data 622 includes instructions that may be used by controller 618 to cause service provider 624 to further stop providing the Wi-Fi hotspot network with the first SSID a predetermined time period after instructing the first access point device to provide the first Wi-Fi hotspot network with the first SSID.

Predictor 624 can include a dedicated control circuit, CPU, microprocessor, etc., that is able to predict a future position of a client device based on a position and velocity of the client device.

In this example, in client device 120, controller 222, memory 224, radio 228, interface circuit 230 and display 232 are illustrated as individual devices. However, in some embodiments, at least two of client device 120, controller 222, memory 224, radio 228, interface circuit 230 and display 232 may be combined as a unitary device. Further, in some embodiments, at least one of client device 120, controller 222, memory 224, radio 228, interface circuit 230 and display 232 may be implemented as a computer having non-transitory computer-readable media for carrying or having computer-executable instructions or data structures stored thereon.

Returning to FIG. 4, if it is determined that an activation signal is not received (N at S404), then it is then determined whether a probe request is received (S406). For example, returning to FIG. 6A, in a no-broadcast standby mode, receiving component 616 of radio 610 may receive a probe request from radio 228 of client device 120, in the event that client device 120 transmits a probe request while in the receiving area of access point device A30. If a probe request is received, radio 610 may then inform controller 604 of the receipt of the probe request.

Returning to FIG. 4, if it is determined that a probe request is not received (N at S406), then method 400 continues to wait for an activation signal (return to S404). If it is determined that an activation signal has been received (Y at S404) or if it is determined that a probe request has been received (Y at S406), then a network is established (S408). For example, returning to FIG. 6A, in the no-broadcast standby mode as mentioned above, controller 604 will have been informed by radio 610 of the receipt of either the probe request or the activation signal. In either event, controller 604 may then instruct radio 610 to provide power to broadcast component 614. Broadcast component 614 may then establish a Wi-Fi hotspot using the SSID identified in the received probe request or the received activation signal.

Returning to FIG. 4, after the network has been established (S408), the client position and velocity is found (S410). In some example embodiments, an APD finds the position and velocity of the client device. In other embodiments, as will be described much later, cellular service provider 540 provides the client position and velocity to service provider 536. For now, a more detailed discussion of APD finds the position and velocity of the client device.

In an example embodiment, returning to FIG. 6A, access point device A30 may determine the position and velocity of client device 120. This determination may be performed by controller 604 instructing radio 610 to request the position and velocity of client device 120 from client device 120.

Upon receiving this request, controller 222 of client device 120 may determine its position and velocity by any known system or method, non-limiting examples of which include a global positioning system or a Wi-Fi triangulation system. Controller 222 may then instruct radio 228 to transmit a client device position signal which includes information describing the position and velocity of client device 120.

Radio 610 of APD A30 may then receive the client device position signal from client device 120.

In other embodiments, client device 120 may provide the client device position signal to APD A30 without receiving a request from APD A30. In some embodiments, client device 120 provides the client device position signal to APD A30 at predetermined time intervals. In some embodiments, client device 120 provides the client device position signal to APD A30 after a predetermined event, a non-limiting example of which includes client device 120 connecting to Wi-Fi hotspot network N64.

Returning to FIG. 4, after the client position and velocity is found (S410), the client device position signal is transmitted (S412). For example, returning to FIG. 6A, APD A30 transmits the client device position signal to service provider 536 by way of service 538.

Returning to FIG. 4, after the client device position signal is transmitted (S412), it is determined whether a standby signal has been received (S414). For example, returning to FIG. 6A radio 610 of APD A30 is in constant communication with radio 228 of client device 120 until client device 120 disassociated with APD, by any known method, non-limiting examples of which include a disassociation resulting from a Basic Service Set (BSS) transition request, a Blacklist disassociation and client device 120 moving out of range of radio 610. In any of these methods, controller 604 will know whether client device 120 has disassociated from APD A30.

Returning to FIG. 4, if it is determined that a standby signal has been received (Y at S414), then the network is disbanded (S416). For example, returning to FIG. 6A, if client device 120 receives a standby signal from service provider 536, then APD A30 will revert to the no-broadcast standby mode, wherein controller 604 will instruct radio 610 to turn off power to broadcasting component 614.

Returning to FIG. 4, after the network is disbanded (S416), method 400 stops.

However, if it is determined that a standby signal has not been received (N at S414), then it is determined whether a new activation signal is received (S420). For example, as shown in FIG. 6A, APD will determine whether a new activation signal is received. This may be performed in manner similar to that discussed above (S404). The difference here (S420) is that an APD is determining whether any additional activation signals are being received based on a new SSID, as compared with the original SSID that is currently enabled.

Consider now, a situation wherein at least some of the client devices have moved throughout the portion of city 100. This will be described in more detail with reference to FIG. 5B.

Figure 5B:
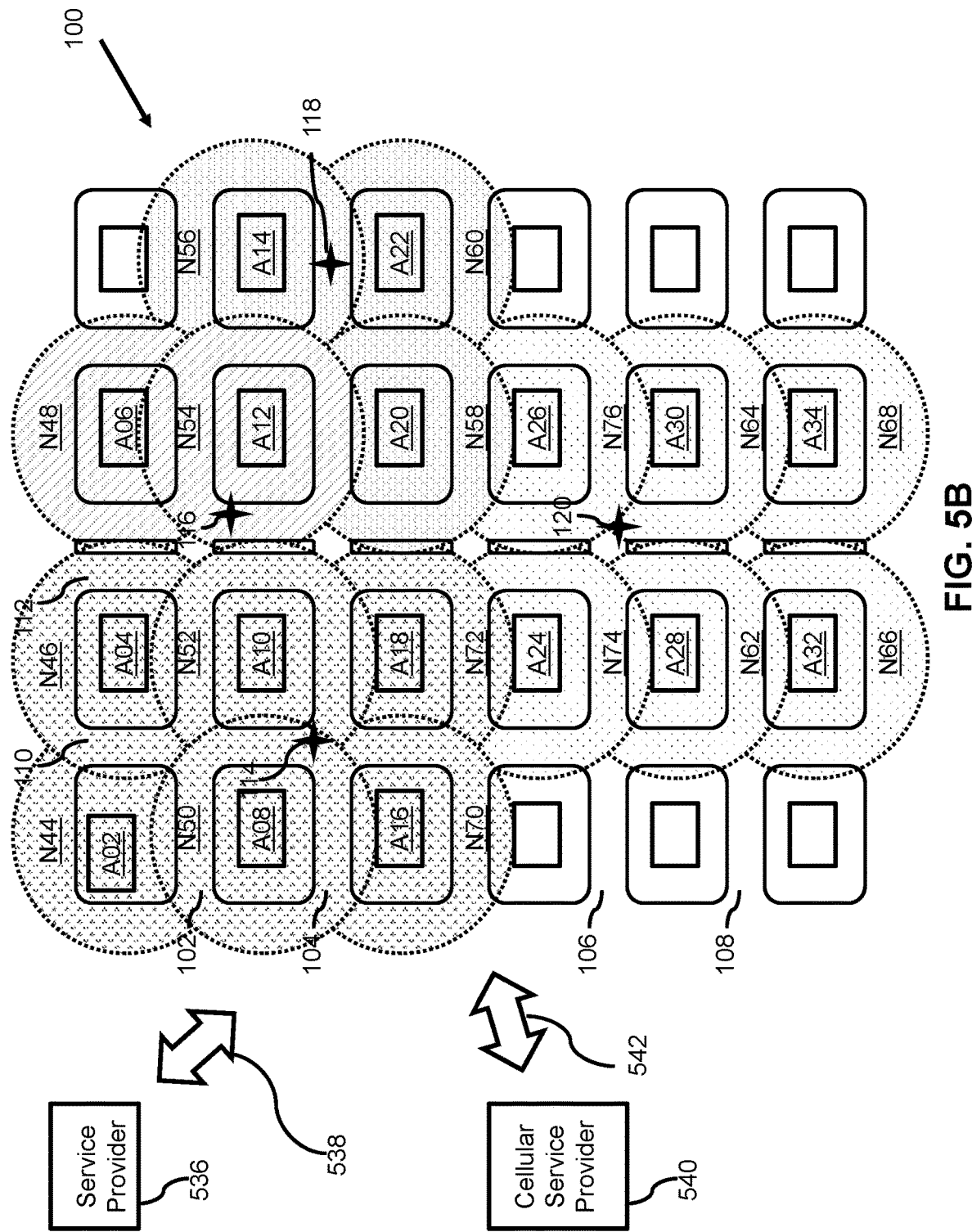
FIG. 5B illustrates the portion of the city of FIG. 5A, at a time $t_2$.

FIG. 5B illustrates the portion of city 100 of FIG. 5A, at a time $t_2$.

As shown in the figure, at time $t_2$, city 100 includes all the elements of FIG. 5A discussed above, with the addition of: a Wi-Fi hotspot network N74, which is provided by APD A24; a Wi-Fi hotspot network N76, which is provided by APD A26; a Wi-Fi hotspot network N70, which is provided by APD A16; and a Wi-Fi hotspot network N72, which is provided by APD A18.

As compared to time $t_1$ discussed above with reference to FIG. 5A, at time $t_2$, the user of client device 114 has moved south on street 110 and the user of client device 120 has moved north on street 112.

For client device 114, at a time $t_2$ after time $t_1$, service provider 536 have will have received the client device position signal indicating the position and velocity of client device 114. The client device position signal will be used to determine whether additional APDs need to be initiated. This will be described in greater detail with reference to FIG. 7.

Figure 7:
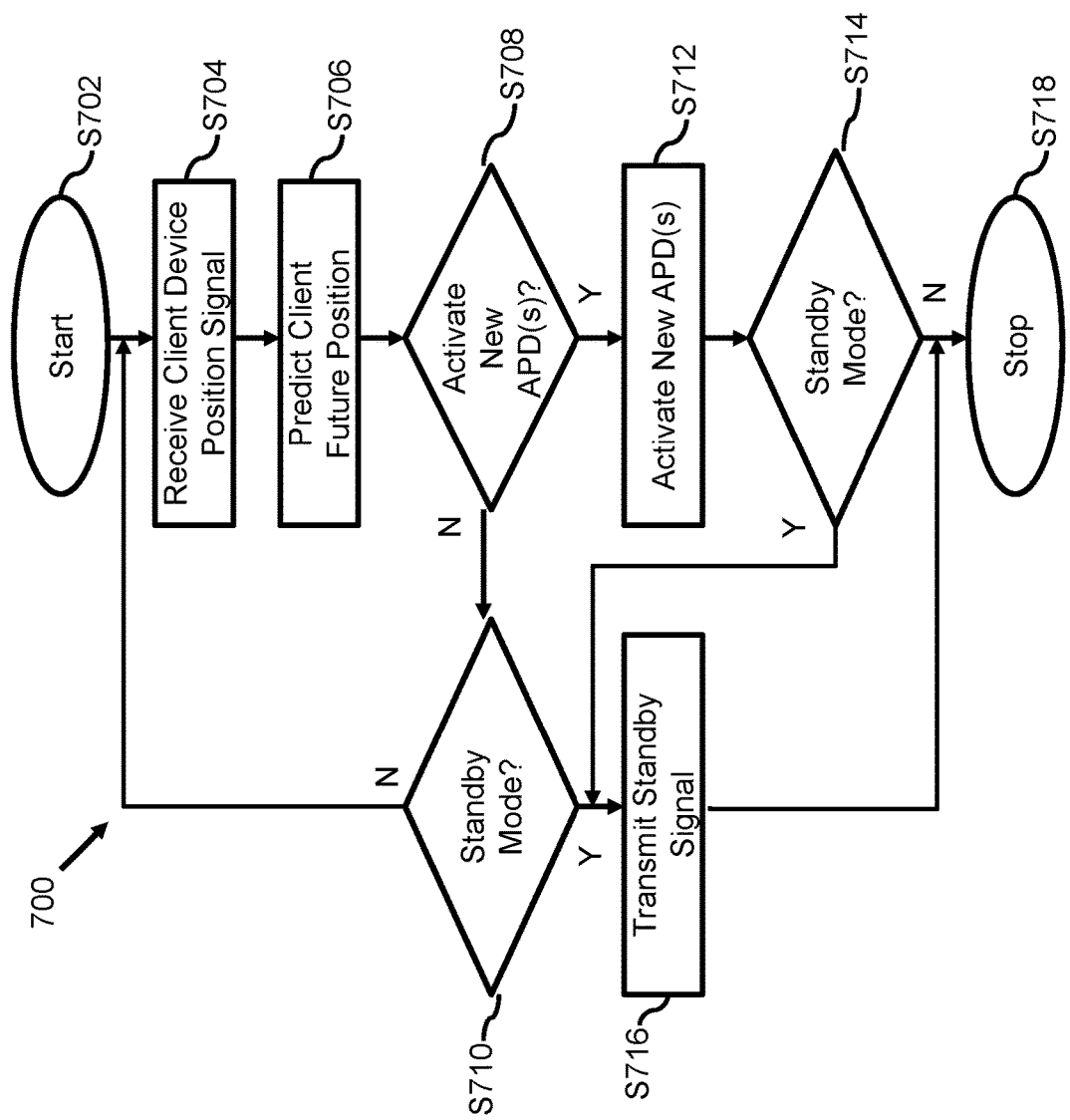
FIG. 7 illustrates an example method for operating an electronic communication traffic server device in order to reduce power consumption of a network of APDs in accordance with aspects of the present disclosure.

FIG. 7 illustrates an example method 700 for operating an electronic communication traffic server device in order to reduce power consumption of a network of APDs in accordance with aspects of the present disclosure.

As shown in the figure, method 700 starts (S702), and a client device position signal is received (S704). For example, in some embodiments as discussed above with reference to FIGS. 4 and 6A-B, service provider 536 receives the client device position signal from ABD A30 (see S412).

Figure 6B:
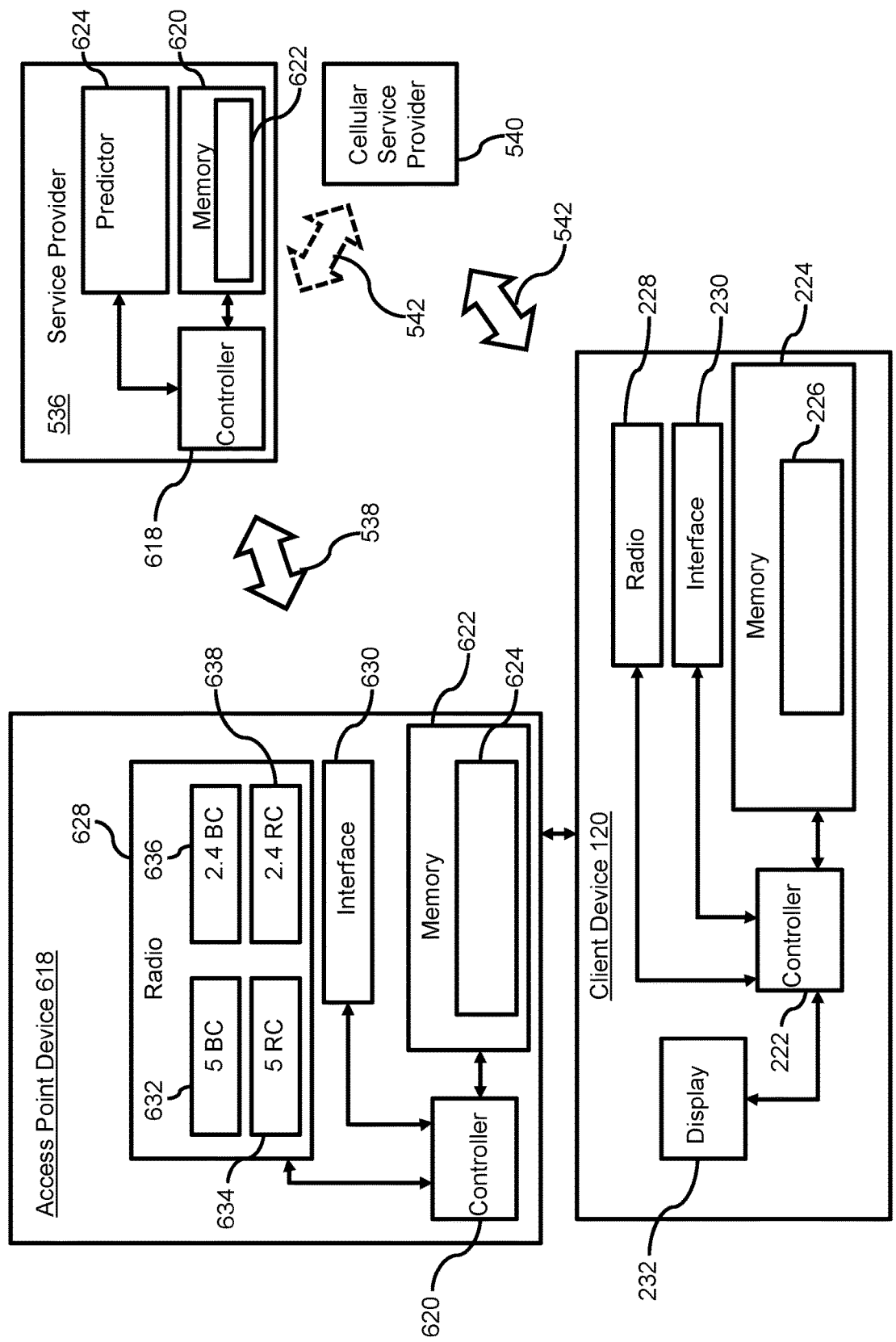
FIG. 6B illustrates an exploded view of another embodiment of an APD, a client device, a service provider of FIG. 5A.

Returning to FIG. 7, after the client device position signal is received (S704), a future position of the client device is predicted (S706). For example, as shown in FIGS. 6A and 6B, controller 618 of service provider 536 will instruct predictor 624 to predict a likely future position of the user of client device 120 based on the client device position signal.

Returning to FIG. 7, after the future position of the client device is predicted (S706), it is determined whether a new APD is to be activated (S708). For example, as shown in FIGS. 6A-B, controller 618 determines whether new APDs are to be activated.

For example, returning to FIG. 5B, consider the user of client device 114, who at time $t_2$ is located at the corner of streets 104 and 110 and is traveling south. At this position and velocity, controller 618 determines that the person will likely either: stop moving or turn east so as to stay within Wi-Fi hotspot network N52, which has been broadcasting from APD A10 since time $t_1$ as shown in FIG. 5A; continue south so that client device 114 will need to be handed off to a Wi-Fi hotspot network that would be provided by APDs A16 or A18; or turn west so as to be handed off to Wi-Fi hotspot network N50, which has been broadcasting from APD A08 since time $t_1$ as shown in FIG. 5A or a Wi-Fi hotspot network that would be provided by APD A16. In this case, controller 618 determines that APDs A16 and A18 will need to be activated to account for the predicted movement of wireless client 114.

Similarly, consider the user of client device 120, who at time $t_2$ is located at the corner of streets 112 and 106 and is traveling north. At this position and velocity, controller 618 determines that the person will likely either: stop moving or turn east so as to stay within Wi-Fi hotspot network N64, which has been broadcasting from APD A30 since time $t_1$ as shown in FIG. 5A; continue north so that client device 120 will need to be handed off to a Wi-Fi hotspot network that would be provided by APDs A24 or A26; or turn west so as to be handed off to Wi-Fi hotspot network N62, which has been broadcasting from APD A28 since time $t_1$ as shown in FIG. 5A or a Wi-Fi hotspot network that would be provided by APD A24. In this case, controller 618 determines that APDs A24 and A26 will need to be activated to account for the predicted movement of client device 120.

Now, consider the user of client device 116, who at time $t_2$ is located at the same position, thus with no velocity, that they occupied at time $t_1$ discussed above with reference to FIG. 5A. At this position and velocity, controller 618 determines that the person will likely remain. In this case, controller 618 determines that no new APD will need to be activated to account for the predicted movement of client device 116.

Similarly, now consider the user of client device 118, who at time $t_2$ is located at the same position, thus with no velocity, that they occupied at time $t_1$ discussed above with reference to FIG. 5A. At this position and velocity, controller 618 determines that the person will likely remain. In this case, controller 618 determines that no new APD will need to be activated to account for the predicted movement of client device 118.

Returning to FIG. 7, if it is determined that a new APD is not to be activated (N at S708), it is further determined whether any currently activated APDs should be placed in a standby mode (S710). For example, as shown in FIGS. 6A and B, controller 618 determines whether the predicted likely future position of the user of client device 120, based on the client device position signal, will take client device out of range of any currently activated APDs. This will be described in greater detail with reference to FIG. 5C.

Figure 5C:
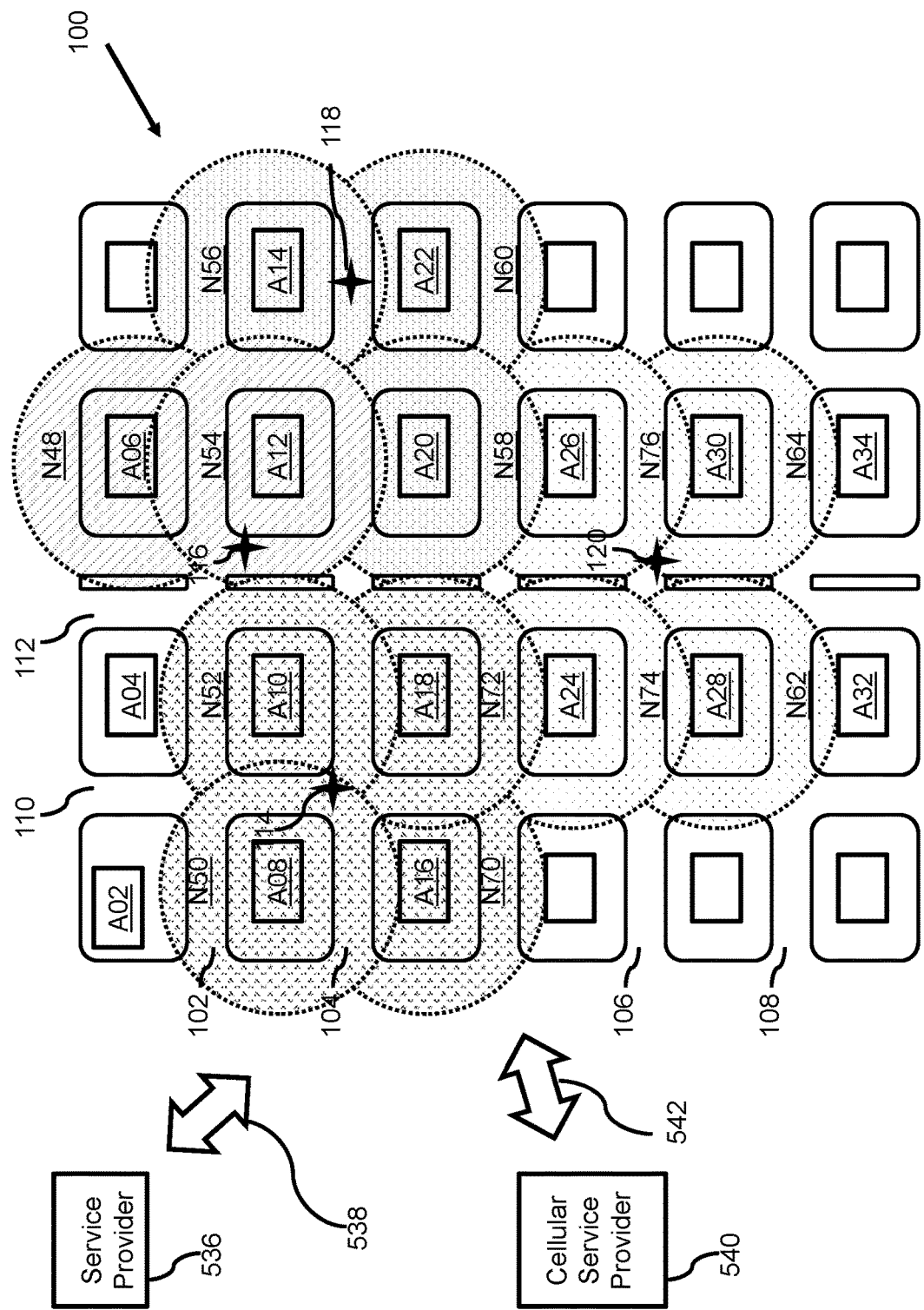
FIG. 5C illustrates the portion of the city of FIG. 5A, at a time $t_3$.

FIG. 5C illustrates the portion of city 100 of FIG. 5A, at a time $t_3$.

As shown in the figure, at time $t_3$, city 100 includes some elements of FIG. 5B discussed above, but is missing: Wi-Fi hotspot network N64, which is provided by APD A02; Wi-Fi hotspot network N46, which is provided by APD A04; Wi-Fi hotspot network N66, which is provided by APD A32; and Wi-Fi hotspot network N68, which is provided by APD A34.

Consider the user of client device 114, who at time $t_3$ is similarly situated as they were at time $t_2$ discussed above with reference to FIG. 5B. In this case, the time difference, $\Delta t_{12}$, between time $t_1$ and time $t_2$ is much greater than the time difference, $\Delta t_{23}$, between time $t_2$ and time $t_3$. The time difference, $\Delta t_{12}$, reflects the difference in time for the person using client device to travel from the location illustrated in FIG. 5A to the location illustrated in FIG. 5B. The time difference, $\Delta t_{23}$, reflects the time for service provider 536 to recognize that an APD may need to be put in a standby mode (as discussed with reference to FIG. 5B) and the APD actually being placed in a standby mode.

As discussed above, after time $t_2$, but prior to time $t_3$, controller 618 had determined that the person using client device 114 is not, and will not be, in range of Wi-Fi hotspot network N44 of APD A02 or in range of Wi-Fi hotspot network N46 of APD A04 at time $t_3$. In this case, controller 618 determines that APDs A02 and A04 will need to be placed in standby mode to account for the predicted movement of wireless client 114.

Similarly, consider the user of client device 120, who at time $t_3$ is similarly situated as they were at time $t_2$ discussed above with reference to FIG. 5B. As discussed above, after time $t_2$, but prior to time $t_3$, controller 618 had determined that the person using client device 120 is not, and will not be, in range of Wi-Fi hotspot network N66 of APD A32 or in range of Wi-Fi hotspot network N68 of APD A34 at time $t_3$. In this case, controller 618 determines that APDs A32 and A34 will need to be placed in standby mode to account for the predicted movement of wireless client 120.

Returning to FIG. 7, if it is determined that no currently activated APDs are to be placed in a standby mode (N at S710) then method 700 continues to wait for a new client device position signal (S704). However, if it is determined that any currently activated APDs are to be placed in a standby mode (Y at S710), then the APDs are placed in a standby mode (S716). For example, as shown in FIG. 6A, controller 618 transmits a standby signal, via service 538, to any APDs that are to be place in a standby mode into standby mode. Any APDs receiving the standby signal may then operate in a manner as discussed above with reference to FIG. 4 (S414), or as described below with further reference to FIG. 4 (S430).

In some non-limiting example embodiments, the standby signal will instruct an APD to stop providing the Wi-Fi hotspot network with an SSID identified in the standby signal. In some non-limiting example embodiments, the standby signal will instruct an APD to immediately stop providing the Wi-Fi hotspot network. In other non-limiting example embodiments, the standby signal will instruct an APD to stop providing the Wi-Fi hotspot network after a predetermined time period, for example, after 10 seconds. In other non-limiting example embodiments, the standby signal will instruct an APD to stop providing the Wi-Fi hotspot network after occurrence of an event.

Returning to FIG. 5C, in the example of time $t_3$, APDs A02, A04, A32 and A34 are example APDs that have received a respective standby signal from service provider 536 via service 538 and that have subsequently been placed in a standby mode so as to no longer broadcast a respective Wi-Fi hotspot service.

In this example embodiment, for the purposes of discussion, again let the maximum power expenditure, $p_{max}$, be that as discussed above with reference to equation (1), which in this example would be $P_{max}=24*8=192$ power units.

However, in accordance with aspects of the present disclosure, at time $t_2$, as discussed above, the present power expenditure, $p_p$, would be equal to the sum of the SSIDs from the APDs that are presently broadcasting. In this example, APDs A02, A04, A06, A08, A14, A16, A18, A20, A22, A24, A26, A28, A30, A32 and A34 are broadcasting a single SSID, and APDs A10 and A12 are broadcasting two SSIDs. Therefore, the present power expenditure, $p_p$, at time $t_2$ would be 15*(1)+2*(2), or 19 power units.

By comparing the power that is constantly consumed by the conventional system discussed above with reference to FIG. 3, with the example embodiment of the present disclosure discussed above with reference to FIG. 5A, the percentage of power savings at time $t_2$ is (192-19)/192, or 90.1% savings in power expenditure in broadcasting.

Returning to FIG. 7, after the APDs are placed in a standby mode (S716), method 700 stops (S718).

Returning to FIG. 7, if it is determined that new APD(s) is(are) to be activated (Y at S708), then new APD(s) is(are) activated (S712). For example, any new APDs may be activated in a manner discussed above with reference to FIG. 4 (e.g., S408) and FIGS. 5B-C.

Returning to FIG. 7, after the new APD(s) is(are) activated (S712), it is determined whether any currently activated APDs should be placed in a standby mode (S714). This may be performed in a manner as described above (S710).

If it is determined that any currently activated APDs are to be placed in a standby mode (Y at S714), then the APDs are placed in a standby mode as discussed above (S716). However, if it is determined that no currently activated APDs are to be placed in a standby mode (N at S714), then the method 700 stops (S718).

Returning to FIG. 4, if it is determined that a new activation signal is not received (N at S420), then it is then determined whether a new probe request is received (S422). This operation may be performed in a manner similar to that discussed above (S406). The difference here (S422) is that an APD is determining whether any additional probe requests are being received on a new SSID, as compared with the original SSID that is currently enabled.

If it is determined that a new probe request is not received (N at S422), then method 400 continues to wait for a standby signal (return to S414).

If it is determined that a new activation signal has been received (Y at S420) or if it is determined that a new probe request has been received (Y at S422), then a new network is established (S424). This operation may be performed in a manner similar to that discussed above (S408). The difference here (S424) is that an APD is establishing a new Wi-Fi hotspot network using new SSID that is identified in the newly received activation signal (S420) or the newly received probe request (S422) as compared with the original SSID that is currently enabled.

An example of an APD establishing a new Wi-Fi hotspot network using a new SSID that is identified in a newly received activation signal is APD A26 establishing Wi-Fi hotspot network N76 as shown in FIG. 5B as discussed above.

Returning to FIG. 4, after the new network has been established (S424), the new client position and velocity is found (S426). This operation may be performed in a manner similar to that discussed above (S410). The difference here (S426) is that the position and velocity of the client that is found is a new client device associated with the newly received activation signal (S420) or the newly received probe request (S422) as compared with the client device that is currently connected.

After the new client position and velocity is found (S426), a new client device position signal is transmitted (S428). This operation may be performed in a manner similar to that discussed above (S412). The difference here (S428) is that the new client device position signal corresponding to a new client device that has associated with the newly established Wi-Fi hotspot network (S424) as compared with the client device position signal corresponding to client device that was previously currently connected.

Returning to FIG. 4, after the new client device position signal is transmitted (S428), it is determined whether a standby signal has been received (S430). This operation may be performed in a manner similar to that discussed above (S412). Returning to FIG. 4, if it is determined that a standby signal has been received (Y at S430), then the new network is disbanded (S432). This operation may be performed in a manner similar to that discussed above (S416). An example of an APD disbanding a Wi-Fi hotspot network is APD A34 disbanding Wi-Fi hotspot network N68 as shown in FIG. 5C as discussed above.

Returning to FIG. 4, after the new network has disbanded (S432), it is determined whether all the networks have disbanded (S434). For example, as shown in FIG. 6A, controller 604 may determine whether broadcasting component 614 of radio 610 is broadcasting any SSIDs to maintain any Wi-Fi hotspot networks.

If it is determined that all the networks have not disbanded (N at S434), then it is again determined whether a standby signal has been received (return to S430). However, it if is determined that all the networks have disbanded (Y at S434), method 400 stops (S418). Therefore, an APD, such as APD A34 in FIG. 5C, will be in a standby mode, waiting for either an activation signal from service provider 536 or probe request for a new client device.

In this example embodiment, as shown in FIG. 5C, for the purposes of discussion, again let the maximum power expenditure, $p_{max}$, be that as discussed above with reference to equation (1), which in this example would be $P_{max}=24*8=192$ power units.

However, in accordance with aspects of the present disclosure, at time $t_3$, as discussed above, the present power expenditure, $p_p$, would be equal to the sum of the SSIDs from the APDs that are presently broadcasting. In this example, APDs A06, A08, A14, A16, A18, A20, A22, A24, A26, A28 and A30 are broadcasting a single SSID, and APDs A10 and A12 are broadcasting two SSIDs. Therefore, the present power expenditure, $p_p$, at time $t_3$ would be 11*(1)+2*(2), or 15 power units.

By comparing the power that is constantly consumed by the conventional system discussed above with reference to FIG. 3, with the example embodiment of the present disclosure discussed above with reference to FIG. 5A, the percentage of power savings at time $t_3$ is (192-15)/192, or 92.2% savings in power expenditure in broadcasting.

In the no-broadcast standby mode embodiment discussed above with reference to FIG. 6A, APD A30 saves power in the standby mode by providing power receiving component 616 and not providing power to broadcasting component 614, until receiving component 616 receives either an activation signal from service provider 536 or a probe request from client device 120. In another embodiment, an APD saves power in the standby mode by providing power to one set of a receiving component and a broadcasting component, of a plurality of sets of receiving components and broadcasting components. This embodiment may be termed a multi-band radio standby mode embodiment and will be described in greater detail with reference to FIG. 6B.

FIG. 6B illustrates an exploded view of another embodiment of an APD 618, client device 120, service provider 536.

As shown in the figure, APD 618 includes a controller 620, a radio 628, an interface circuit 630, and a memory 622, which includes controller executable instructions 624 stored therein. Radio 628 includes a 5 GHz broadcasting component 632, a 5 GHz receiving component 634, a 2.4 GHz broadcasting component 636 and a 2.4 GHz receiving component 638.

In this example, controller 620, radio 628, interface circuit 630 and memory 622 are illustrated as individual devices. However, in some embodiments, at least two of controller 620, radio 628, interface circuit 630 and memory 622 may be combined as a unitary device. Further, in some embodiments, at least one of controller 620, radio 628, interface circuit 630 and memory 622 may be implemented as a computer having non-transitory computer-readable media for carrying or having computer-executable instructions or data structures stored thereon.

In this example, 5 GHz broadcasting component 632, 5 GHz receiving component 634, 2.4 GHz broadcasting component 636 and 2.4 GHz receiving component 638 are illustrated as individual devices. However, in some embodiments, at least two of 5 GHz broadcasting component 632, 5 GHz receiving component 634, 2.4 GHz broadcasting component 636 and 2.4 GHz receiving component 638 may be combined as a unitary device. Further, in some embodiments, at least one of 5 GHz broadcasting component 632, 5 GHz receiving component 634, 2.4 GHz broadcasting component 636 and 2.4 GHz receiving component 638 may be implemented as a computer having non-transitory computer-readable media for carrying or having computer-executable instructions or data structures stored thereon.

Further, with respect to implementation of the example embodiment of FIG. 6B, wherein if it is determined that an activation signal is not received (N at S404 of FIG. 4), then it is then determined whether a probe request is received (S406), in the multi-band radio standby mode, 2.4 GHz receiving component 638 of radio 628 may receive a probe request from radio 228 of client device 120, in the event that client device 120 transmits a probe request while in the receiving area of access point device 618. If a probe request is received, radio 628 may then inform controller 620 of the receipt of the probe request.

Further, with respect to implementation of the example embodiment of FIG. 6B, wherein if it is determined that an activation signal has been received (Y at S404) or if it is determined that a probe request has been received (Y at S406), then a network is established (S408), in the multi-band radio standby mode as mentioned above, controller 222 will have been informed by 2.4 GHz receiving component 638 of radio 628 of the receipt of either the probe request or the activation signal. In either event, controller 620 may then instruct radio 628 to instruct 2.4 GHz broadcast component 636 and 2.4 GHz receiving component 638 to establish a Wi-Fi hotspot in the 2.4 GHz band using the SSID identified in the received probe request or the received activation signal. Further, in the event that client device 120 connects with APD 618 using the newly created Wi-Fi hotspot in the 2.4 GHz band, APD 618 may communicate with client device 120 to determine whether client device 120 additionally supports communication within the 5 GHz band. If it is determined that client device 120 additionally supports communication within the 5 GHz band, then controller 620 within APD 618 may instruct radio 628 to provide power to 5 GHz broadcasting component 632 and 5 GHz receiving component 634 and establish a second Wi-Fi hotspot in the 5 GHz band with a new SSID. Client device 120 may then be steered, by any known steering system or method, from the Wi-Fi hotspot in the 2.4 GHz band to the Wi-Fi hotspot in the 5 GHz band.

Still further, it should be noted that disbanding the network (S416) may be performed in a consistent manner using APD 618 as shown in FIG. 6B. For example, if client device 120 was the only client device associated with APD 618, then APD 618 will revert to the multi-band radio standby mode. Specifically, if controller 620 determines that no wireless clients are associated, then controller 620 will instruct radio 628 to turn off power to 5 GHz broadcasting component 632 and to 5 GHz receiving component 634.

In the non-limiting example embodiments discussed above with reference to FIG. 4, an APD may receive a probe request from a client device (e.g., S406 and S422) to initiate the establishment of a Wi-Fi hotspot network. Further, in the non-limiting example embodiments discussed above with reference to FIG. 4, an APD may find the client position and velocity and transmit the information as a client device position signal to service provider 536.

In other embodiments one or both of these operations may be performed by cellular service provider 540. For example, the operations illustrated in dotted box 402 in FIG. 4 and dotted box 404 in FIG. 4 may optionally not be performed by an APD because the cellular service provider 540 may transmit a client device position signal to service provider 536.

As shown in FIG. 6A-B, cellular service provider 540 is configured to monitor the position and velocity of client device 120 by any known method, non-limiting examples of which include a global positioning system. This position and velocity information of client device 120 may be provided to cellular service provider 540 via cellular service 542. Once obtained, cellular service provider 540 may send the information as a client device position signal to service provider 536 via cellular service 542 (shown as the dotted double arrow 542). The double arrow for cellular service 542 is dotted in FIG. 6A to reflect this optional embodiment wherein the client device position signal is provided by cellular service provider 540.

In this embodiment, because cellular service provider 540 monitors client devices that use service 542, cellular service provider 540 will provide service provider 536 with the client device position signal well prior to the client devices getting close enough to any of the APDs to warrant the use of a probe request. Accordingly, as shown in dotted boxes 402 and 404 of FIG. 4, a decision as to whether a probe request is received is not needed.

In the example embodiments discussed above, the client devices are illustrated as moving down streets though a portion of a city. It should be noted that aspects of the present invention are still enabled if the client devices move into buildings between the streets.

Wi-Fi networks are described in the non-limiting example embodiments discussed above. It should be noted that any wireless network that uses a plurality of APDs may employ aspects of the present invention.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A Wi-Fi access point device for establishing a Wi-Fi hotspot network, the Wi-Fi access point device comprising:
　a memory;
　a processor configured to execute instructions stored on the memory to cause the Wi-Fi access point device to:
　　establish the Wi-Fi hotspot network with a SSID based on at least one of an activation signal and a first probe request associated with the SSID, the first probe request received from a client device; and
　　operate the Wi-Fi hotspot network with the SSID in a standby mode based upon a disassociation from an associated client device, wherein the associated client device comprises the client device having been associated with the established Wi-Fi hotspot network.

2. The Wi-Fi access point device of claim 1, wherein the processor is further configured to instruct the Wi-Fi access point device to:
　determine a position and a velocity of the client device when the client device is associated with the established Wi-Fi hotspot network; and
　transmit a client device position signal to the service provider, the client device position signal being based on the determined position and velocity of the client device.

3. The Wi-Fi access point device of claim 1, wherein the processor is further configured to instruct the Wi-Fi access point device to operate the Wi-Fi hotspot network with the SSID in the standby mode a predetermined time period after the disassociation from the associated client device.

4. The Wi-Fi access point device of claim 1, further comprising:
　a radio having a receiving component and a broadcasting component,
　wherein the broadcasting component is configured to broadcast data associated with the Wi-Fi hotspot network,
　wherein the receiving component is configured to receive the activation signal, the first probe request and the standby signal, and
　wherein, when operating the Wi-Fi hotspot network with the SSID in the standby mode, the processor is configured to turn the broadcasting component off to save power.

5. The Wi-Fi access point device of claim 4, wherein the broadcasting component comprises a 5 GHz broadcasting component and a 2.4 GHz broadcasting component, and wherein the receiving component comprises a 5 GHz receiving component and a 2.4 GHz receiving component.

6. The Wi-Fi access point device of claim 5, wherein the processor is further configured to instruct the Wi-Fi access point device to:
determine that the client device supports communication within a 5 GHz band; and
establish a second Wi-Fi hotspot in the 5 GHz band with a new SSID.

7. The Wi-Fi access point device of claim 6, wherein the processor is further configured to instruct the Wi-Fi access point device to:
determine that no wireless client devices are associated with the access point device; and
instruct the radio to turn off power to the 5 GHz broadcasting component and to the 5 GHz receiving component.

8. A method for a Wi-Fi access point device to establish a Wi-Fi hotspot network, the method comprising:
establishing the Wi-Fi hotspot network with a SSID based on at least one of an activation signal and a first probe request associated with the SSID, the first probe request received from a client device; and
operating the Wi-Fi hotspot network with the SSID in a standby mode based upon a disassociation from an associated client device, wherein the associated client device comprises the client device having been associated with the established Wi-Fi hotspot network.

9. The method of claim 8, further comprising:
determining a position and a velocity of the client device when the client device is associated with the established Wi-Fi hotspot network; and
transmitting a client device position signal to the service provider, the client device position signal being based on the determined position and velocity of the client device.

10. The method of claim 8, further comprising:
operating the Wi-Fi hotspot network with the SSID in the standby mode a predetermined time period after the disassociation from the associated client device.

11. The method of claim 8, further comprising:
broadcasting, by a broadcasting component of a radio, data associated with the Wi-Fi hotspot network;
receiving, by a receiving component of the radio, the activation signal, the first probe request and the standby signal; and
when operating the Wi-Fi hotspot network with the SSID in the standby mode, turning the broadcast component off to save power.

12. The method of claim 11, wherein the broadcasting component comprises a 5 GHz broadcasting component and a 2.4 GHz broadcasting component, and wherein the receiving component comprises a 5 GHz receiving component and a 2.4 GHz receiving component.

13. The method of claim 12, further comprising:
determining that the client device supports communication within a 5 GHz band; and
establishing a second Wi-Fi hotspot in the 5 GHz band with a new SSID.

14. The method of claim 13, further comprising:
determining that no wireless client devices are associated with the access point device; and
instructing the radio to turn off power to the 5 GHz broadcasting component and to the 5 GHz receiving component.

15. A non-transitory, computer-readable media of a Wi-Fi access point device having computer-readable instructions stored thereon, that when executed by a processor of the Wi-Fi access point device cause the Wi-Fi access point device to:
establish the Wi-Fi hotspot network with a SSID based on at least one of an activation signal and a first probe request associated with the SSID, the first probe request received from a client device; and
operate the Wi-Fi hotspot network with the SSID in a standby mode based upon a disassociation from an associated client device, wherein the associated client device comprises the client device having been associated with the established Wi-Fi hotspot network.

16. The non-transitory computer-readable media of claim 15, wherein the computer-readable instructions when executed by the process further cause the Wi-Fi access point device to at least one of:
determine a position and a velocity of the client device when the client device is associated with the established Wi-Fi hotspot network, and transmit a client device position signal to the service provider, the client device position signal being based on the determined position and velocity of the client device; and
operate the Wi-Fi hotspot network with the SSID in the standby mode a predetermined time period after the disassociation from the associated client device.

17. The non-transitory computer-readable media of claim 15, wherein the computer-readable instructions when executed by the process further cause the Wi-Fi access point device to:
broadcast, by a broadcasting component of a radio, data associated with the Wi-Fi hotspot network;
receive, by a receiving component of the radio, the activation signal, the first probe request and the standby signal; and
when operating the Wi-Fi hotspot network with the SSID in the standby mode, turning the broadcast component off to save power.

18. The non-transitory computer-readable media of claim 17, wherein the broadcasting component comprises a 5 GHz broadcasting component and a 2.4 GHz broadcasting component, and wherein the receiving component comprises a 5 GHz receiving component and a 2.4 GHz receiving component.

19. The non-transitory computer-readable media of claim 18, wherein the computer-readable instructions when executed by the process further cause the Wi-Fi access point device to:
determine that the client device supports communication within a 5 GHz band; and
establish a second Wi-Fi hotspot in the 5 GHz band with a new SSID.

20. The non-transitory computer-readable media of claim 19, wherein the computer-readable instructions when executed by the process further cause the Wi-Fi access point device to:
determining that no wireless client devices are associated with the access point device; and
instructing the radio to turn off power to the 5 GHz broadcasting component and to the 5 GHz receiving component.

* * * * *